United States Patent [19]

Ongaro

[11] 4,078,339
[45] Mar. 14, 1978

[54] METHOD FOR CORRECTING RUBBER TIRES FOR FORCES GENERATED BY DYNAMIC NON-UNIFORMITIES

[75] Inventor: Theodore Ongaro, Columbus, Ohio

[73] Assignee: Ongaro Dynamics, Inc., Columbus, Ohio

[21] Appl. No.: 666,951

[22] Filed: Mar. 15, 1976

Related U.S. Application Data

[60] Continuation-in-part of Ser. No. 558,915, Mar. 17, 1975 abandoned, which is a division of Ser. No. 525,011, Nov. 18, 1974, abandoned.

[51] Int. Cl.² .............................................. B24B 1/00
[52] U.S. Cl. ............................... 51/281 R; 51/106 R; 51/165 R; 51/324; 51/DIG. 33; 73/146
[58] Field of Search .................. 73/146; 51/DIG. 33, 51/106 R, 165 R, 281 R, 324

[56] References Cited

U.S. PATENT DOCUMENTS

| | | | |
|---|---|---|---|
| 3,479,867 | 11/1969 | Tarpinian et al. | 73/146 |
| 3,553,903 | 1/1971 | Christie | 51/165 R |
| 3,631,716 | 1/1972 | Monajjem | 73/146 |
| 3,661,014 | 5/1972 | Ciampolini | 73/146 |
| 3,724,137 | 4/1973 | Hofelt | 51/106 R |
| 3,729,992 | 5/1973 | Lichtman | 73/146 |
| 3,848,368 | 11/1974 | Toshioka et al. | 51/165 R |
| 3,911,751 | 10/1975 | Shooter | 51/106 X |

OTHER PUBLICATIONS

Society of Automotive Engineers, No. 720464, "High Speed Uniformity Machines & Nature of Tire Force Variations," by Hofelt, et al.

*Primary Examiner*—Harold D. Whitehead
*Attorney, Agent, or Firm*—Melville, Strasser, Foster & Hoffman

[57] ABSTRACT

An integrated system for measuring and correcting rubber tires for forces generated by dynamic non-uniformities and for measuring and marking both sides of the tire for lack of symmetry. The force measurements are fed to a computer and the forces indicative of dynamic non-uniformities correlated to given angular positions on the tire by means of a pair of transmissions which act as a shaft encoder, the transmissions incorporating computer controlled timing discs which act through an hydraulic controller to control the honing mechanism which cuts the outside periphery of the tires at the proper locations and in the proper amounts to reduce the non-uniformities to an acceptable low level. Computer control means are also provided to revolve the tires to the proper positions for the marking of their side walls to indicate points of maximum unbalance so that corrective measures may be thereafter taken to correct the tires for lack of symmetry.

27 Claims, 12 Drawing Figures

METHOD FOR CORRECTING RUBBER TIRES FOR FORCES GENERATED BY DYNAMIC NON-UNIFORMITIES

This is a continuation-in-part of application Ser. No. 558,915, filed Mar. 17, 1975 now abandoned, which in turn is a division of application Ser. No. 525,011, filed Nov. 18, 1974 and now abandoned.

BACKGROUND OF THE INVENTION

In the current state of the prior art, techniques utilized to correct vibrations generated in vehicular tires are basically modifications of balancing devices utilized in industry to balance industrial components, such as rotors. The state of the art is such that industry can achieve accurate balance and freedom from vibration in any type of rotor. Balancing can be readily accomplished since a rotor is effectively a homogenous non-flexible mass, and it is always supported in bearings while freely rotating in space, whether during balancing or in actual use. A rotor, once balanced, has its principal axis of rotation rotating in coincidence with its bearing axis.

A rubber tire, unlike a rotor, is not a solid mass; rubber, a tire is flexible and expands and contracts in use and is not geometrically round. The radius of a load supporting tire in the area of contact with the road is always smaller than its radius at any other angle about the tire. As the tire revolves the physical geometrical center of the tire is never coincident with its principal bearing axis, as encountered in any other type of rotor, including a tire freely rotating in space.

While it has hitherto been proposed to hone the outside periphery of rubber tires to improve their concentricity, in many instances the vibratory effects of the tire are worsened rather than improved. It is significant to note that the force measurements utilized by the prior art to determine where on the tire the honing should take place were not made while the tire was rotating under true environmental-like condition; that is, the measurements were taken while the tire was being revolved at speeds of approximately 1 to 5 m.p.h. Consequently, such measurements do not take into account the effects of the non-uniform amplified centrifugal forces encountered when the tire is rotated at actual highway speeds, that is, at speeds in excess of 35-40 m.p.h. under which conditions the tire expands radially outwardly in an irregular manner producing hump-like irregularities. These irregularities vary in length, height and location about the periphery of the tire and are intensified by the fact that as the tire expands its elasticity is also affected, the tire reacting as if it were inflated with much greater air pressure.

While prior to the work of the present inventor, there was a recognition by the prior art of the existence of force variations which are centrifugally generated at high speeds, as well as a recognition that honing the tire at slow speeds does not correct for such centrifugally generated forces, there was no known way to accurately measure the forces involved much less make the necessary corrections even if the magnitude and location of the forces were known. The state of the art was such that it was literally impossible to segregate and measure these centrifugally generated forces, and it was equally impossible to correct the tire while rotating it at high speeds.

The present inventor, in his copending U.S. Pat. No. 3,862,570, dated Jan. 28, 1975, has taught a measuring system by means of which the forces generated in a tire under load and at high speeds can be accurately measured as well as segregated. In accordance with the teachings of this patent, both the dynamic unsymmetrical forces and the centrifugally generated forces which are the result of radially loaded peripheral non-uniformities are simultaneously measured and recorded by means of a closed loop piezoelectric measuring system so that appropriate corrective measures may be taken. Two sets of sensors are utilized, the first set measuring lack of symmetry (unbalance) on both sides of the tire, and the second set measuring centrifugally generated non-uniformities as they appear in the area of the tire patch, which is the area in contact with the road, and hence of vital importance.

An integrated system for correcting a tire both for peripheral non-uniformities and for lack of symmetry is taught in the present inventor's co-pending application Ser. No. 623,639, filed Oct. 20, 1975. In accordance with the teachings of this application, the measuring system of the aforementioned patent is utilized to measure both the magnitude and location of the forces generated by peripheral non-uniformities and also the magnitude and location of the forces generated by lack of tire symmetry. The measuring means generate signals which are fed to a digital computer which governs the correction of the tire in a two-stage corrective procedure, the first stage comprising the honing of the outside periphery of the tire while it is being revolved at cruising speed at the proper locations and in sufficient amounts to effectively remove the non-uniform areas which are developed in the tire. Concurrently the measuring means also determines and feeds to the computer signals indicating the locations and amounts of weight necessary to counterbalance the forces generated by lack of symmetry in the tire once it has been corrected for the peripheral non-uniformities.

The present invention relates to the corrective system of the aforementioned co-pending application, with particular reference to that portion of the system on which the tire is measured and honed to correct for peripheral non-uniformities, although as will become apparent, the present invention also incorporates techniques for marking the tire to facilitate subsequent correction for lack of symmetry. In order to place the present invention in prooper perspective, it must be understood that the conventional automobile moving at a speed of 60 m.p.h. travels 88 feet per second, which is equivalent to 1056 inches per second. Stated in another way, a 1 inch length of the tire periphery enters the tire patch in less than 1 millisecond, that is, over 1000 Hz. Thus, at 60 m.p.h. a standard size automobile tire revolves approximately 12 times per second and during each revolution covers approximately 88 inches of road surface. In other words, a 1 inch length of the periphery of the tire becomes tangentially in contact with the road and begins to support the weight load of the vehicle in less than 0.001 second. Relating this data to a measuring and correcting system for honing the periphery of the tire, the honer must be actuated to contact the leading edge of an irregular growth area on the tire 1 millisecond and retract fully away from the tire in 1 millisecond at the trailing end of the non-uniform growth area, it being remembered that each 0.001 second represents 1 inch of tire peripheral surface. The present invention deals with a system capable of honing the tire within these parameters.

SUMMARY OF THE INVENTION

In accordance with the present invention, there is provided a new and improved method and means for automatically measuring and correcting a rubber tire for centrifugally generated non-uniformities, as well as measure the tire for lack of symmetry and apply appropriate indicia to the tire for subsequent correction of its lack of symmmetry.

The system of the present invention in its preferred embodiment is completely automated and adaptable to an industrial assembly line. The system utilizes the closed loop piezoelectric measuring system of the present inventor's aforesaid co-pending patent, a first pair of piezoelectric sensors being operative to detect variations of radial load forces on both sides of the tire in the patch area, with a second pair of sensors operative to measure lack of symmetry on both sides of the tire. Data relating to the measured forces is fed into a computer wherein the data is correlated to an angular position on the tire by means of a reference signal representative of a given rotational position of the tire. The computer controls the mechanism for honing the outside periphery of the tire at the proper locations to reduce the peripheral non-uniformities to an acceptable low level, and the computer additionally controls mechanism for marking the opposite sides of the tire in accordance with measured data indicative of lack of symmetry.

The system includes a pair of quills mounted on dovetail slides fastened to a supporting frame. Each quill supports a hub-like structure formed with a contour similar to that of one-half of a tire wheel. When the tire is conveyed to the measuring station and positioned, the two hub-like structures are moved into contact with the tire as though it were being mounted on a wheel. Air is introduced into the tire to inflate it to the desired pressures for both initial accommodation to the wheel-halves and for subsequent measuring and correction.

A pair of back-to-back transmissions adapted to be rotated in unison with the tire being corrected are utilized as a shaft encoder to synchronize the measured data with a reference point on the tire as well as to actuate the honing devices to hone the periphery of the tire in accordance with the measured data. To this end, the transmissions include a pair of computer controlled timing discs which mechanically establish the rotational position on the tire at which the honing operation is to be performed, one of the discs actuating the honing mechanism through an hydraulic valve system and the other serving to withdraw the honing mechanism. The transmission drive is also utilized as a means for referencing the tire relative to a marking device by means of which the opposite sides of the tire are marked for subsequent correction for lack of symmetry.

A plurality of honing devices are positioned adjacent the tire to be corrected, the honing devices each being mounted on a set of dovetail slides by means of which the movement of the honing wheels toward and away from the periphery of the tire is controlled, the honing devices incorporating both hydraulic and electrical control means operative to initially being their honing wheels to an operative position and then into close proximity to the periphery of the tire, whereupon the honing wheels are extended for contact with the periphery of the tire at the proper locations to hone the detected non-uniformities, whereupon the honing wheels are retracted. The honing operation is repeated for each revolution of the tire until the tire is corrected to a predetermined standard.

When the honing of the outer periphery of the tire is completed, the rotation of the tire is stopped and the tire indexed to the proper rotational positions for the marking of its opposite side walls in accordance with the measured data indicative of lack of symmetry, the indexing being carried out by the computer acting through the back-to-back transmissions. Thereafter, the tire is deflated and removed for transfer to a second station at which the tire is corrected for lack of symmetry.

DESCRIPTION OF THE DRAWINGS

FIG. 5 is a plan view of the system.

FIG. 6 is a vertical sectional view taken along the irregular line 6—6 of FIG. 5.

FIG. 7 is a horizontal sectional view taken along the line 7—7 of FIG. 6.

DESCRIPTION OF THE PREFERRED EMBODIMENT

Figure 1:
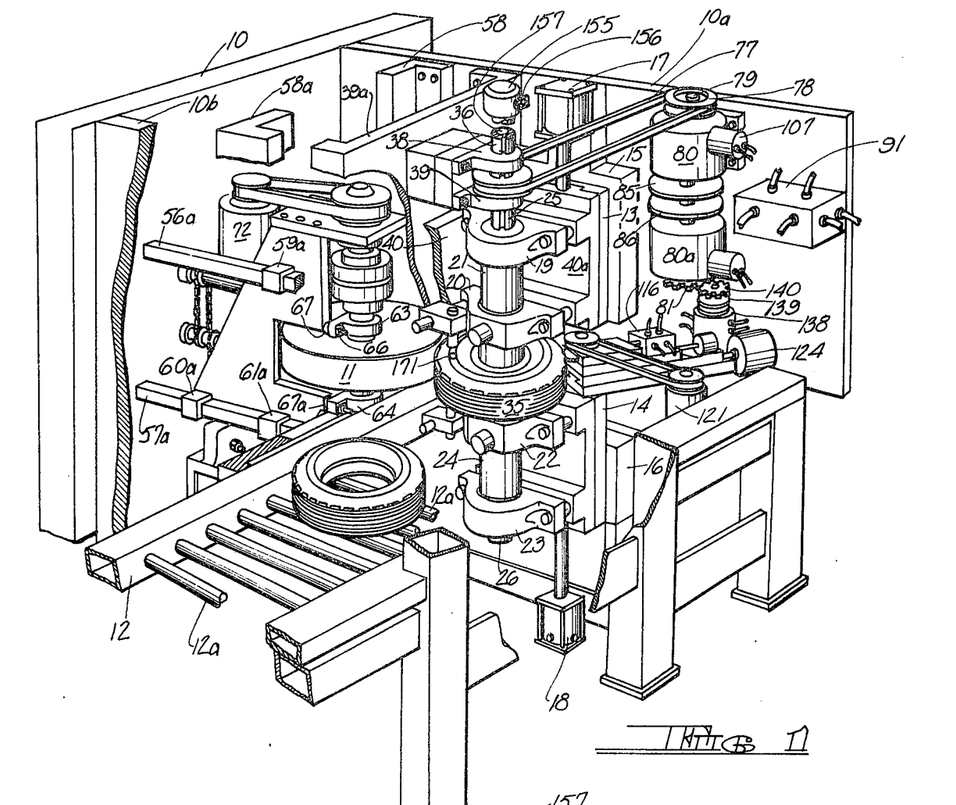
FIG. 1 is a partial perspective view, with parts broken away, of a tire measuring and correcting system in accordance with the present invention.

Referring now to the drawings and in particular to the over-all machine illustrated in perspective in FIG. 1, the construction of the machine is integrated with a conventional tire conveyor system. The main frame 10 supports a horizontally disposed rotating road wheel 11 positioned above and to one side of the conveyor 12. A pair of dovetail slides 13 and 14 is mounted for vertical movement on stationary dovetail members 15 and 16 secured to frame member 10a which project outwardly at right angles from frame 10. The upper dovetail slide 13 overlies the conveyor 12, whereas the lower slide 14 is movable from a position in which it underlies the conveyor 12 to a position in which it extends upwardly through the conveyor, as shown in FIG. 1, the lower slide having a vertical movement which is greater than upper slide 13. The dovetail slides 13 and 14 are moved vertically by hydraulic cylinders 17 and 18 mounted on the machine frame.

Figure 2:
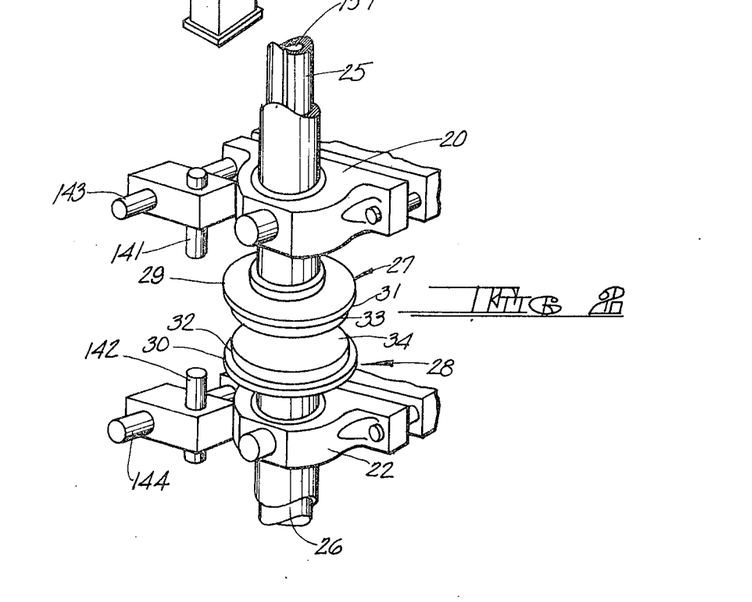
FIG. 2 is an enlarged fragmentary perspective view of the two half-wheels and their supporting quills, together with the mechanism for marking the opposite side walls of the tire.

The upper dovetail slide 13 supports pillow blocks 19 and 20 which, in turn, support a heavy quill 21. The lower dovetail slide 14 supports pillow blocks 22 and 23 which support a heavy quill 24. A spindle 25 is rotatably journaled in quill 21, and a similar spindle 26 is rotatably journaled in quill 24. With reference to FIG. 2, a pair of hub-like wheel-halves 27 and 28 are fixedly mounted on the inner ends of the spindles 25 and 26, respectively, the wheel-halves lying in face-to-face relationship. Their outer flanges 29 and 30 together with beads 31 and 32 and the inwardly tapered diameters accommodate an automobile tire in the same manner as if the tire were mounted on a regular rim. The centers 33 and 34 of the hubs are centrally machined relative to each other, the two wheel-halves joining together with their spindles in axial alignment to form a rigid unit when hydraulic cylinders 17 and 18 have moved the dovetail slides 13 and 14 toward each other. Adjustable stops (not shown) will control the centering of the tire 35 on the centerline of the road-way driving wheel 11, the stops being adjusted in accordance with the physical size of the tire being corrected. It will be understood that the tire engaging assembly mounted on lower dovetail slide 14 will retract below the conveyor rollers 12a, the conveyor rollers being spaced apart by a distance sufficient to permit vertical movement of the lower wheel-half 28. When in the retracted position, the parts mounted on the lower slide will underlie the conveyor rollers 12a so that the tires may move along the conveyor without interference. Similarly, when the upper dovetail slide 13 is moved upwardly, the upper wheel-half 27 will be elevated and will not interfere with movement of the tires over the conveyor rollers 12a.

Figure 8:
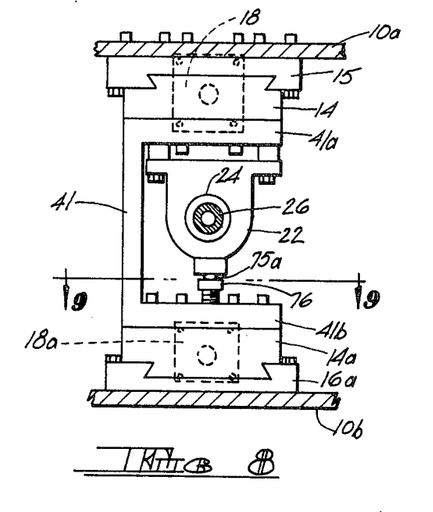
FIG. 8 is a horizontal sectional view taken along the line 8—8 of FIG. 6.
Figure 9:
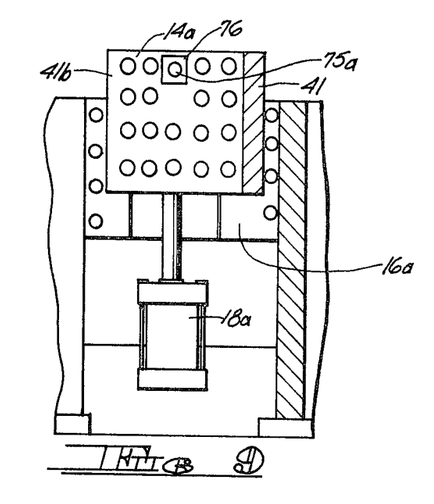
FIG. 9 is a vertical sectional view taken along the line 9—9 of FIG. 8.

The upper spindle 25 is machined to provide a keyway 36 to which a timing gear pulley 37 is slidably keyed, the timing gear pulley being supported by pillow blocks 38 and 39 mounted on a reinforcing frame member 39a. As best seen in FIG. 5, a channel-shaped frame member 40 has its opposite legs 40a and 40b secured to dovetail slides 13 and 13a, respectively, the dovetail slide 13a being slidably mounted in a fixed dovetail support 15a mounted on frame member 10b projecting outwardly from main frame 10 in parallel relation to frame member 10a. A companion hydraulic cylinder 17a is operatively connected to dovetail slide 13a. In similar fashion, and as seen in FIGS. 8 and 9, a channel-shaped support member 41 has its opposite legs 41a and 41b secured to lower dovetail slide 14 and its opposing counterpart 14a, the dovetail slide 14a being slidably mounted on fixed dovetail support 16a secured to the lower portion of frame member 10b. The dovetail slide 14a is raised and lowered in unison with dovetail slide 14 by means of underlying hydraulic cylinder 18a.

Referring next to FIG. 6, a bracket 42 extending between the main frame 10 and base frame 10c mounts a motor driven right angle reduction gear drive 43 having an output shaft 44 which, through single sprocket 45 and chain 46, drives twin sprocket 47 in threaded engagement with precision jack screw 48. A chain 49 extends between the other half of twin sprocket 47 and a sprocket 50 which is internally threaded to accept precision jack screw 51. The jack screws 48 and 51 are adapted to rotate in unison and their thrust is taken up by bearings 52 and 53 mounted on main frame 10, the jack screws being free to pass through the main frame. The opposite ends of the jack screws 48 and 51 are secured to a central upright frame flange 54 (seen in FIG. 5) which forms a part of road wheel supporting housing 55. The housing 55 is slidably mounted on sets of upper track member 56, 56a and lower track members 57, 57a, the track members being bolted at their rearmost ends to the main frame 10 and at their forward ends to the right angle frame members 58 and 58a which have their remaining flanges bolted to the frame members 10a and 10b, respectively. The road wheel housing 55 is slidably mounted on the sets of track members by upper bearing blocks 59 and 59a slidable on upper track members 56, 56a, respectively, the lower tracks 57, 57a being slidably engaged by sets of bearing blocks, such as the set of bearing blocks 60a, 61a seen in FIG. 6, it being understood that a similar set of bearing blocks will engage the lower track 56, one such bearing block being seen at 60 in FIG. 5.

As possibly best seen in FIG. 6, the road wheel 11 is mounted on a drive shaft 62 rotatably journaled in pillow blocks 63 and 64 mounted on road wheel supporting housing 55 on opposite sides of road wheel 11. As seen in FIG. 7, the pillow block 63 is bolted to one side of the housing 55 by means of a cap screw 65, while on its opposite side a special cap screw 66 secures the pillow block to the housing 55 with a sensor 67 interposed therebetween. The lower pillow block 64 will be secured to the housing 55 in a like manner, including the use of special cap screw 66a and sensor 67a, as seen in FIG. 6. The sensors 67, 67a comprise piezoelectric quartz crystals in accordance with the teachings of the inventor's aforementioned co-pending patent.

As also seen in FIG. 6, road wheel 11 is driven by means of half couplings 68 and 68a connected respectively to shaft 62 and to a stub shaft 62a supported by double flange bearing 69 and 69a mounted on support plate 70 bolted to the upper surface of housing 55. A timing pulley 71 is keyed to the upper end of stub shaft 62a and is driven by motor 72, pulley 73 and drive belt 74, the motor 72 being mounted on the upper portion of the road wheel supporting housing 55.

With the arrangement just described, the road wheel 11 will be moved into contact with the tire 35 and the desired load applied by means of the twin precision screws 48 and 51 driven by reduction gear drive 43. The road wheel is driven at the desired speed by motor 74 and the road wheel, in turn, drives the tire being corrected. The amount of load applied to the tire through the road wheel will be as close as possible to that which will be encountered in actual use by the tire being corrected. It should be pointed out that in the application of the load to the tire being corrected, a momentary force is applied to the piezoelectric quartz crystals 67, 67a, but the sensors will immediately return to a zero reading position once the load is applied and fixed, and thereafter the sensors will react only to the dynamic forces generated by non-uniformities developed in the portion of the tire in contact with the road wheel. Thus, as the tire revolves, the sensors 67, 67a will continuously measure the forces generated by peripheral non-uniformities throughout the full width of the tire tread and throughout the full 360° circumference of the tire, and the sensors will generate force signals indicative of the magnitude and location of the generated forces, which signals are fed to the computer which controls the operation of the system. In similar fashion, a pair of piezoelectric quartz crystal sensors 75, 75a lie between the pillow blocks 20 and 22 and the opposing seats 76, 76a mounted on support members 40b and 41b, respectively, as seen in FIGS. 5 and 8. This set of sensors comprises the second half of the measuring system and acts to measure for lack of symmetry in the tire. The sensors 75, 75a are mounted at right angles with respect to the sensors 67, 67a and are positioned to measure lack of symmetry (unbalance) on both sides of the tire. In this connection, it may be pointed out that the lack of symmetry will vary on the opposite sides of the tire and the points of maximum unbalance will usually lie at different angular locations. The force signals generated by sensors 75, 75a are also fed to the computer where they are recorded and stored. The manner in which the stored information is utilized will be explained hereinafter upon completion of the description of the physical components of the system.

THE TWIN TRANSMISSIONS

As seen in FIGS. 1, 5 and 6, the timing gear pulley 37 mounted on spindle 25 is engaged by a drive belt 77 which drives timing gear pulley 78 mounted on a drive shaft 79 for the twin transmissions 80 and 80a which are mounted on frame member 10a.

Figure 4:
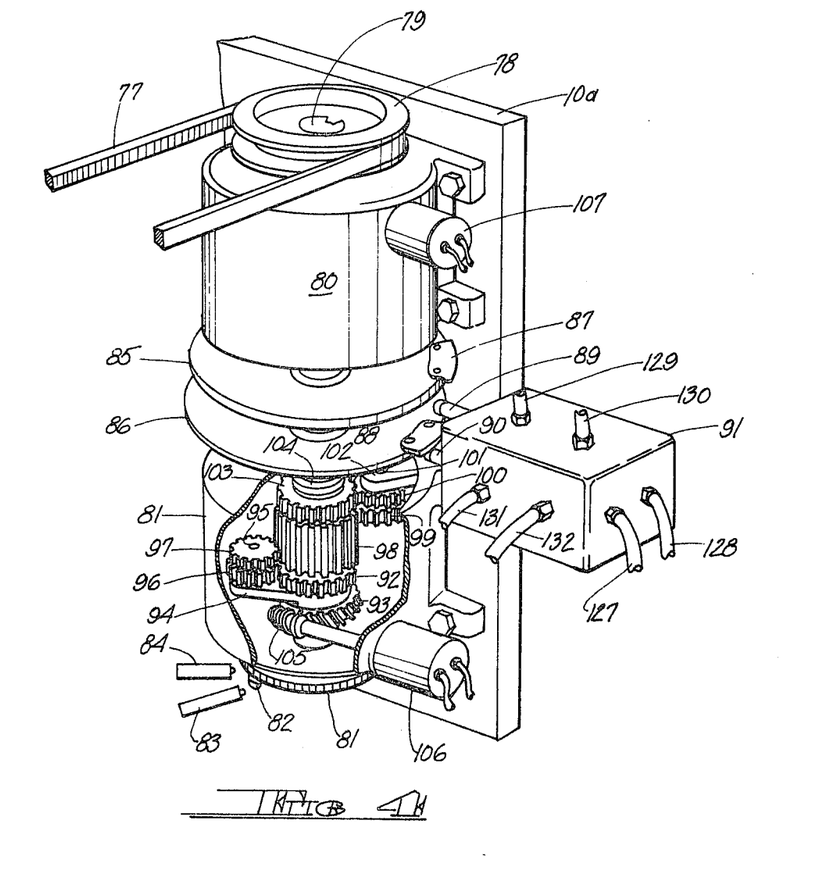
FIG. 4 is a perspective view, with parts broken away, of the dual transmission assembly.

With particular reference to FIG. 4, the transmission drive shaft 79 extends dwonwardly beneath the lowermost transmission 80a where it mounts a toothed gear 81 which, in the embodiment illustrated, has 120 teeth equally spaced about its periphery. A small magnet 82 is mounted on the periphery of gear 81. A first sensor 83 is positioned to sense the magnet 82 and a second sensor 84 is positioned to sense the teeth on the periphery of gear 81.

A pair of timing discs 85 and 86 are rotatably journaled on shaft 79, the discs carrying small protruding cam members 87 and 88 on their respective peripheries, the cam members being positioned to contact push rods 89 and 90 forming a part of dual valve hydraulic controller 91 which is also mounted on frame member 10a.

As shown in partial cutaway of transmission 80a, the drive shaft 79 drives a keyed gear 92 overlying a worm gear 93 which is freely rotatable on shaft 79. Worm gear 93 has an integral arm 94 which carries a shaft 95 having its axis parallel to the axis of drive shaft 79. A larger gear 96 and a smaller gear 97 form a cluster rotatable on shaft 95, with the larger gear 96 in meshing engagement with gear 92 keyed to shaft 79. A wide face free-running gear 98 is rotatably journaled on drive shaft 79, the wide faced gear overlying gear 92 and being in meshing engagement with the smaller cluster gear 97.

The upper portion of the wide face gear 98 meshes with gear 99 which, together with the gear 100 forms a second cluster which is a duplicate of the first cluster, the gear 99 being the smaller gear and gear 100 the larger. The second cluster is free to rotate on shaft 101 which also extends in parallel relation to shaft 79 and is supported by a fixed bracket 102 forming a part of lower transmission 80a. The larger gear 100 of this cluster meshes with a gear 103 which is also free to rotate on drive shaft 79, the gear 103 being a duplicate in size of keyed gear 92. A sleeve 104 also surrounds drive shaft 79, the sleeve 104 being fixedly secured at one end to the gear 103 and at its opposite end to the timing disc 86.

To retrace the gearing system, it operates as follows: the timing gear pulley 78, which is driven in synchronism with the tire being corrected through spindle 25, timing gear pulley 37 and transmission drive belt 77, drives transmission drive shaft 79 which, in turn, freely supports the worm gear 93 which has an integral arm 94 carrying the cluster composed of the larger gear 96 and the smaller gear 97. When the transmission drive shaft 79 is rotated, it drives the keyed gear 92 which is in meshing engagement with the larger cluster gear 96 and the smaller cluster gear 97 rotates the central free-running wide face gear 98. In turn, the wide face gear 98 is in meshing engagement with the duplicate cluster composed of gears 99 and 100, the larger gear 100 being in meshing engagement with the sleeve-carrying gear 103 which is equal in size to the keyed driven gear 93. Thus, the gears 93 and 103 rotate in unison with the transmission drive shaft 79, and the timing disc 86 is thus driven in unison with shaft 79.

It will be understood that the transmission 80 will have an identical gear train to that described in connection with transmission 80a, and consequently the timing disc 85 also will be driven in unison with transmission drive shaft 79.

The worm gear 93 is engaged by a worm drive 105 operatively connected to a stepping motor 106 which, when actuated, rotates the worm drive 105 which, in turn, revolves worm gear 93 relative to drive shaft 79, the worm gear acting to rotate arm 94 which causes smaller gear 97 to rotate wide face gear 98, thereby revolving timing disc 86 relative to drive shaft 79 and hence disposing the disc 86 in a different angular position relative to the transmission drive shaft 79. The timing disc 86 will remain in the adjusted position as long as the worm drive 93 is not rotated further in either direction. With this arrangement, the cam member 88 on timing disc 86 may be positioned at any desired angular location relative to transmission drive shaft 79, and its position relative to the drive shaft will not vary until commanded to do so by the stepping motor 106. In this way the angular position of the timing disc 86 and its cam member 88 is controlled in relation to a fixed reference point on the tire being corrected, which reference point is indicated by magnet 82 as it passes sensor 83, it being remembered that transmission shaft 79 is driven in synchronism with the tire spindle 25.

In like mannler, the angular position of the timing disc 85 of upper transmission 80 is controlled in relation to the fixed reference point, as repesented by magnet 82, by means of a stepping motor 107 which controls the rotational position of timing disc 85 relative to drive shafts 79.

In operation, the cam members 87 and 88 carried by timing discs 85 and 86 are in horizontal alignment with the push rods 89 and 90, respectively, of hydraulic controller 91, and the push rods are moved inwardly when contacted by their respective cam members, the push rods returning to their extended positions after their respective cam members pass over them. As more fully described hereinafter, the push rods 89 and 90 control the flow of hydraulic fluid to actuate and de-actuate a honing device by means of which the periphery of the tire is honed. The timing disc 86, acting through push rod 90, actuates the honer to contact the periphery of the tire and remain in honing position until the timing disc 85, acting through push rods 89, reverses the hydraulic flow and de-actuates the honer. The honing cycle is repeated for each revolution of the timing discs 85 and 86 until the honing operation is completed.

THE HONING MECHANISM

Figure 3:
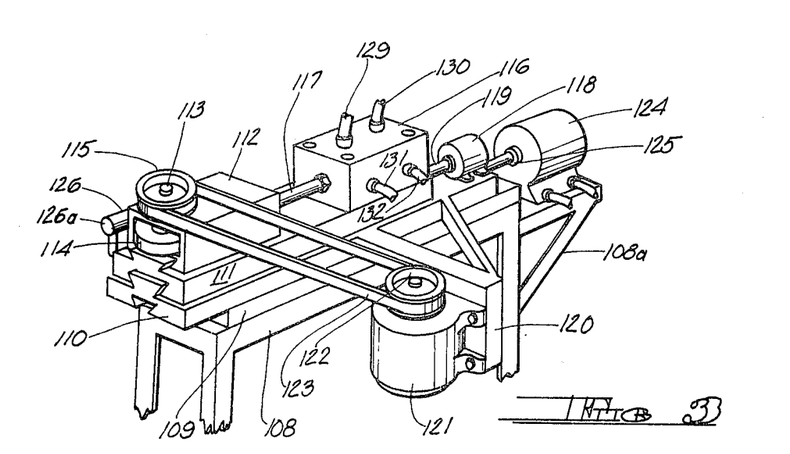
FIG. 3 is a perspective view of one of the honing units.

Referring next to FIG. 3, which illustrates a honing device, a supporting bracket 108, which is adapted to be secured to the machine frame adjacent the tire 35, mounts a stationary male dovetail base plates 109 on which a female dovetail plate 110 is slidably mounted. The upper surface of the plate 110 forms a male guide for a second female dovetail plate 111 which, in turn, has a male dovetail on its upper surface which slidably receives the female dovetail of a rectangular housing 112 which is closed on all sides except the end facing the tire. A vertically disposed spindle 113 is rotatably journaled in the housing 112 adjacent its open end, the spindle mounting a honing wheel 114 which projects outwardly from within the housing 112, the spindle 113 also mounting a timing gear pulley 115 which overlies the housing. The housing 112 together with the honing wheel 114 is thus slidable relative to the underlying second female dovetail plate 111, which, in turn, is slidable relative to the first female dovetail plate 110, and the plate 110 is also slidable relative to stationary base 109.

A single-ended double-acting hydraulic cylinder 116 is mounted on the second female dovetail slide 111 spaced rearwardly from the housing 112, the protruding piston rod 117 of hydraulic cylinder 116 being secured to the rear of rectangular housing 112. Thus, the position of the housing 112 and hence the honing wheel 114 is hydraulically controlled by the cylinder 116.

A stepping motor 118 is mounted on female dovetail plate 110 to the rear of plate 111, the stepping motor having a threaded lead screw 119 extending in prolongation of its drive shaft, the lead screw being threaded into the rear of dovetail plate 111. The electrical stepping motor 118 and threaded lead screw 119 serve to advance and retract dovetail plate 111 which carries the honer housing 112 and its controlling hydraulic cylinder 116.

A bracket 120 projects laterally from female dovetail plate 110 and its outer end supports electric motor 121 equipped with a timing gear pulley 122 and timing belt 123 which drives the honing wheel timing gear pulley 115. The bracket 120 is positioned at right angles to the direction of movement of the sliding plates on which the honer is mounted, and since the forward and rear movement of dovetail plate 111 and housing 112 are relatively small, the driving relationship between gear belt pulleys 115 and 122 is maintained essentially constant at all times.

A double-acting single-ended hydraulic cylinder 124 is mounted on a rearward extension 108a of bracket 108, the piston rod 125 of hydraulic cylinder 124 being secured at its outer end to the female dovetail plate 110 supporting the mounting bracket 120. The hydraulic cylinder 124 is operative to move the entire honer assembly toward and away from the tire, the cylinder 124 preferably having a stroke of about 4 inches. Thus, the entire honer assembly may be moved out of the way during the centering of the tire on the half wheels and the pre-stressing operation, as well as during dismounting of the tire, the honer assembly being moved into close proximity to the periphery of the tire only at such times as the honing operation is to be performed.

The second female dovetail plate 111 also mounts a gauging sensor 126 which is positioned to have its front face 126a in tangential alignment with the leading edge of the honing wheel 114 when the housing 112 is in its fully retracted position. The sensor 126 constantly measures and supplies to the computer the distance in thousandths of an inch increments between its front face 126a and the greatest radial centrifugally developed peripheral tire area, and the computer in turn controls the stepping motor 118 to position the honing wheel a preset distance from the highest area on the tire. The purpose of such measurement is to insure that the honing wheel will always clear the highest point on the periphery of the tire prior to the actual honing operation. In addition, the sensor 126 provides a run-out measurement of the total configuration of the periphery of the tire as its rotates in space.

Referring again to FIG. 4, it will be seen that the dual valve hydraulic controller 91 is provided with a pair of conduits 127 and 128 connected to a source of supply of hydraulic fluid, together with pairs of conduits 129, 130 and 131, 132, the latter pairs of conduits being connected at their opposite ends to hydraulic cylinder 116 (FIG. 3) which controls movement of the honing wheel housing 112 relative to the underlying dovetail plate 111.

Figure 10:
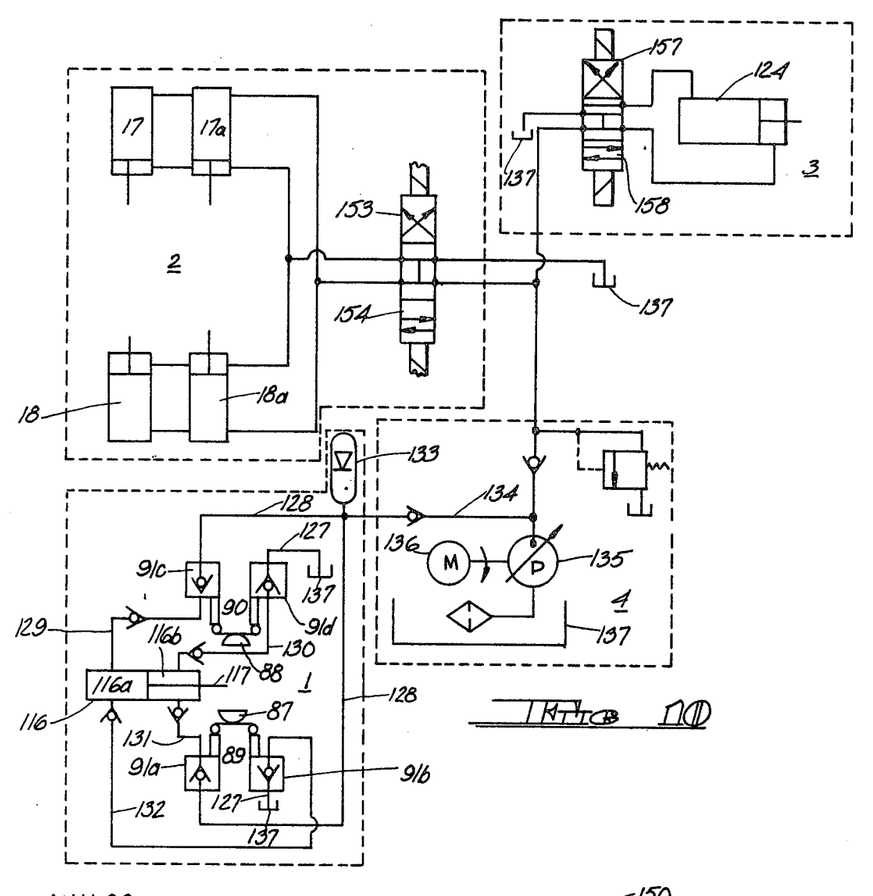
FIG. 10 is a schematic diagram of the hydraulic control circuitry.

The controller 91 under the influence of the timing discs 85 and 96 controls the operation of hydraulic cylinder 116 in a manner which will be best understood by reference to FIG. 10 of the drawings which illustrates the operation of the hydraulic system. As seen therein, block 1 illustrates in schematic form the operation of the honer control system. An accumulator 113 receives fluid under pressure through conduit 134 from the hydraulic power supply system shown in block 4, which includes pump 135 driven by electric motor 136, the fluid being pumped from the reservoir 137. From accumulator 133, conduit 128 provides constant hydraulic pressure to the internal valve sub-assemblies of controller 91 controlled by push rods 89 and 90 which are actuated by the cams 87 and 88 on timing discs 85 and 86, respectively. Push rod 89 controls valves 91a and 91b and push rod 90 controls valve 91c and 91d. When cam 88 depresses push rod 90, valve 91c is opened and allows fluid under pressure to flow through conduit 129 to fill chamber 116a of cylinder 116. Valve 91d is also opened by the push rod 90 to release the fluid pressure in chamber 116b, the fluid flowing through conduit 130 for return through conduit 127 to the reservoir 137. The piston rod 117 in piston 116 is thus advanced to cause the honing wheel to contact the tire. When cam 87 of timing disc 85 comes in contact with push rod 89, the push rod opens valves 91a and 91b. Valve 91a supplies fluid under pressure through conduit 131 to fill chamber 116b of cylinder 116, and simultaneously valve 91b is discharging fluid from chamber 116a through conduit 132, the fluid returning through conduit 127 to the reservoir 137. The piston rod 117 is thus retracted and the honing wheel withdrawn from contact with the tire. The valves 91a, 91b and 91c, 91d will open and close in approximately 3° to 4° of tire periphery movement, but once the valves 91c, 91d have been actuated to extend the piston rod 117 and hence move the honing wheel into contact with the periphery of the tire, the honing wheel will remain in contact with the tire until the valves 91a, 91b have been actuated by the cam 87 to retract the honing wheel.

It is to be understood, however, that before movement of the honing wheel into contact with the periphery of of the tire is initiated by controller 91, the stepping motor 118 will be utilized to move the second dovetail plate 111 to bring the honing wheel assembly mounted thereon into close proximity with the periphery of the tire. To this end, the sensor 126 is utilized to sense the highest spot on the tire, i.e., the area of maximum centrifugal tire peripheral growth, the sensor 126 acting through the computer to energize stepping motor 118 to either advance or retract dovetail slide 111 until the honing wheel is spaced from the area of maximum tire growth by a distance of 0.155 inch. The honing wheel, when displaced by the hydraulic cylinder 116, has a maximum stroke of 0.150 inch; thus the honing wheel will always clear the highest peripheral area on the tire. The honer is advanced through stepping motor 118 in increments of 0.0015 inch per revolution of the tire as commanded by the computer until the acceptable limit has been achieved in honing the undesirable growth areas.

As should now be evident, the honing device has three separate movements. The first movement is by the hydraulic cylinder 124 which moves the entire assembly mounted on dovetail plate 110 from a fully retracted position to a position adjacent to but spaced from the periphery of the tire. The honing device is in its fully retracted position during mounting of the tire, the pre-stressing high velocity runs, and the subsequent dismounting of the tire. Once the tire has been pre-stressed, the honing device will be moved into close proximity to the tire by the action of cylinder 124, whereupon the sensor 126 acting through the stepping motor 118 will bring the honing wheel to within 0.155 inch of the highest spot on the tire. Then, upon command of the timing discs 85 and 86, the honing wheel will be extended into honing engagement with the tire and retracted by the hydraulic cylinder 116 under the control of dual valve hydraulic controller 91.

Referring again to FIGS. 1 and 6, a stepping motor 138 is mounted on frame member 10a beneath the transmission 80a, the stepping motor having an electric clutch 139 keyed thereto, the free running section of the clutch having a gear 140 which is in meshing engagement with the toothed gear 81 keyed to the lowermost end of transmission drive shaft 79. The clutch 139 is computer controlled in combination with stepping motor 138, their function being to position the tire at the proper angular positions for the marking of its side walls to indicate the exact locations of the points of maximum unbalance as determined by the computer based on stored information supplied by the sensors 75, 75a.

The side walls of the tire are marked by adjustable marker solenoids 141 and 142, seen in FIG. 2, which are mounted on arms 143 and 144 projecting outwardly from the pillow blocks 20 and 22, respectively. The solenoids 141 and 142 are adjustable vertically depending upon the size of the tire being corrected. The solenoids are operated and controlled by the computer to affix marks to the opposite side walls of the tire to indicate the exact locations of needed unbalance moment corrections as determined by the computer.

The marking operation will take place after the tire has been corrected for peripheral non-uniformities and the honing mechanism has been withdrawn. The road wheel 11 also will be stopped and retracted to free the tire for rotation by the stepping motor 138 acting through transmission drive shaft 79 and spindle 25. Thus, the stepping motor 138 will revolve the tire to bring the locations on the tire to be marked into alignment with the markers 141 and 142. In this connection, it will be understood that the locations to be marked normally will be different on the opposite sides of the tire, and consequently the tire will be revolved first to the proper position to be marked by the marker 141, and then revolved to the proper location for marking by marker 142.

MODE OF OPERATION

Figure 11:
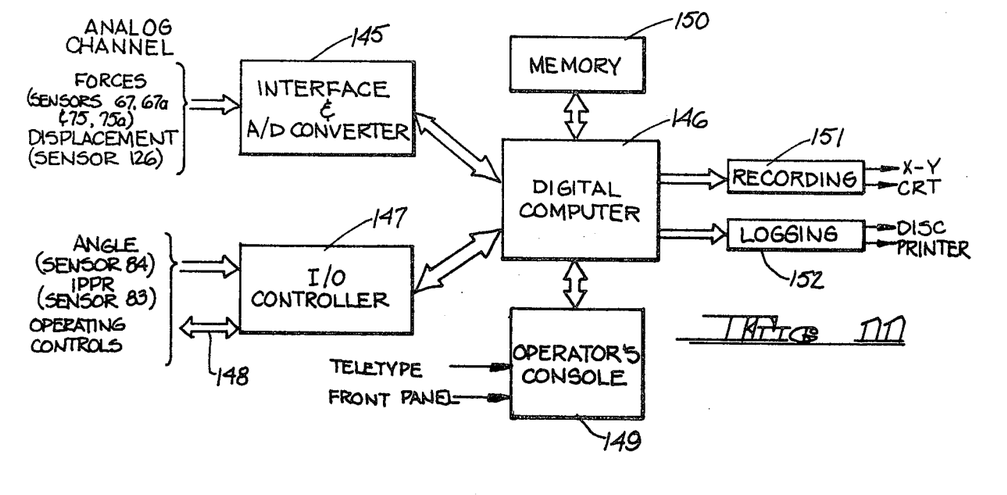
FIG. 11 is a block diagram of the electronic circuitry.

For an understanding of the electronic system utilized in the present invention, reference is made to FIG. 11 wherein it will be seen that force signals from the sets of sensors 67, 67a and 75, 75a, as will as sensor 126, are received by the interface and analog/digital converter 145. These force signals are analog in nature and are continuous, erratic, and have peaks of varying amplitude and duration. The a/d converter 145 converts the peak signals to digital and feeds them to the digital computer 146. Signals from sensors 83 and 84 associated with toothed gear 81 of twin transmissions 80 and 80a, which act as a shaft encoder, are fed to controller 147 which also receives and transmits signals to and from various operating controls for the system, indicated generally at 148. The computer is provided with an operator console 149 having appropriate controls for operating the system, the computer also having a memory bank 150 for receiving and storing data. A recording system 151 is provided which may include an X-Y output chart-type recorder and a cathode ray tube. The recording system also may include a chart-type recorder 152 for documenting and permanently logging information provided by the computer.

With the foregoing general organization in mind, operation of the system will be initiated by applying power to both the hydraulic and electronic systems, as by means of appropriate controls at operator's console 149. The computer 146 may be programmed to run through a test program to determine if all components are operative and that no malfunction has occurred. Upon completion of the test program and acceptance of the results, the computer 146 will set the system in a ready state and, upon receipt of a start command, operation of the system will begin. To this end, the operating controls, indicated at 148, will include a sensor (not shown) on the inlet side of the conveyor 12 which will determine the presence of tires. If tires are present, the conveyor will be actuated and tires will be moved toward an inlet gate (not shown) forming a part of the conveyor. The inlet gate, which is of known construction, halts the leading tire on the conveyor until the system is ready to receive it, whereupon the gate will open and the leading tire positioned to be engaged by the opposing wheel-halves 27 and 28. In this connection it will be understood that the arms of the inlet gate will align and center the tire relative to the wheel-halves. With the tire in proper position, the computer 146 will then signal the control valves 153 and 154, seen in block 2 of FIG. 10, to actuate the sets of hydraulic cylinders 17, 17a and 18, 18a to actuate the mechanism which causes the two wheel-halves to engage the tire 35 and bring it into registry with the road wheel 11.

The computer will next, through operating controls 148, inflate the tire, air under pressure being introduced through fitting 155 and conduit 156 (seen in FIGS. 1, 5 and 6) into hollow central bore 157 in spindle 25. When the tire has reached the proper inflation pressure, the computer will actuate the motor of gear drive 43 to advance the road wheel 11 toward the tire. When the road wheel contacts the tire, the sensors 67, 67a will generate a signal which will cause the computer to activate the road wheel drive motor 72 to revolve the road wheel. The speed of the road wheel will be initially increased until it reaches the desired speed. At the same time, the road wheel will be advancing into the tire until the sensors 67, 67a indicate that the desired load has been applied.

It is preferred to pre-stress and heat the tire prior to initiating the corrective procedures. To this end, the tire will be initially inflated to a pressure approximately 20 percent in excess of its intended operating pressure, and the applied load also will be approximately 20 percent higher than normal. The tire will be exercised under these conditions by revolving it 75–100 times, first in one direction and then in the other, at a velocity which will be about 20 percent higher than normal cruising speed, i.e. if the tire is being corrected for use at a nominal cruising speed of 60 m.p.h., it will be preconditioned at a speed of about 72 m.p.h. Upon completion of the pre-conditioning operation, the speed of the road wheel will be reduced to the desired cruising speed, and the tire pressure and load will also be reduced to their intended normal values, whereupon the tire will be allowed to rotate for a few revolutions in order to stabilize its condition.

The computer will next actuate the hydraulic cylinder 124 of the honing device through control valves 157, 158 seen in block 3 in FIG. 10 to thereby advance the honing device toward the periphery of the tire and maintain dovetail plate 110 in its advanced position. As the run-out sensor 126 is advanced into close proximity to the periphery of the tire, the computer 145 will begin to acquire data. The data acquisition cycle comprises one revolution of the tire and is triggered by the one per revolution pulse generated by sensor 83 as it is energized by the magnet 82 rotating on gear 81 forming a part of the twin transmission 80, 80a. This is the reference point pulse which will be referred to as origin. The toothed gear 81 also generates, through sensor 84, a selected number of pulses during each revolution of the tire. In the present embodiment, 120 pulses are generated during each revolution of the toothed gear. These pulses each represent a deviation of 3° from the point of origin. A digital signal representing the number of degrees (angle) is generated by the computer and is utilized in conjunction with the signals generated by the sets of sensors 67, 67a and 75, 75a to generate a pictorial or polar diagram of the tire. In addition, a run-out diagram of the tire periphery is generated in conjunction with the readings from sensor 126 which, it will be recalled, senses the contour of the periphery of the tire. In essence, the tire is sampled on command from the shaft encoder (sensor 84 which pulses each 3° of revolution) and for each sample a word is generated representing the magnitude of the centrifugally generated non-uniformities and run-out at a given location. These words are stored in the computer memory bank 150 for subsequent analysis. A scanning of the memory bank will provide a visual display of the tire characteristics on the various forms of equipment available, such as CRT, X-Y plotter or printer.

Figure 12:
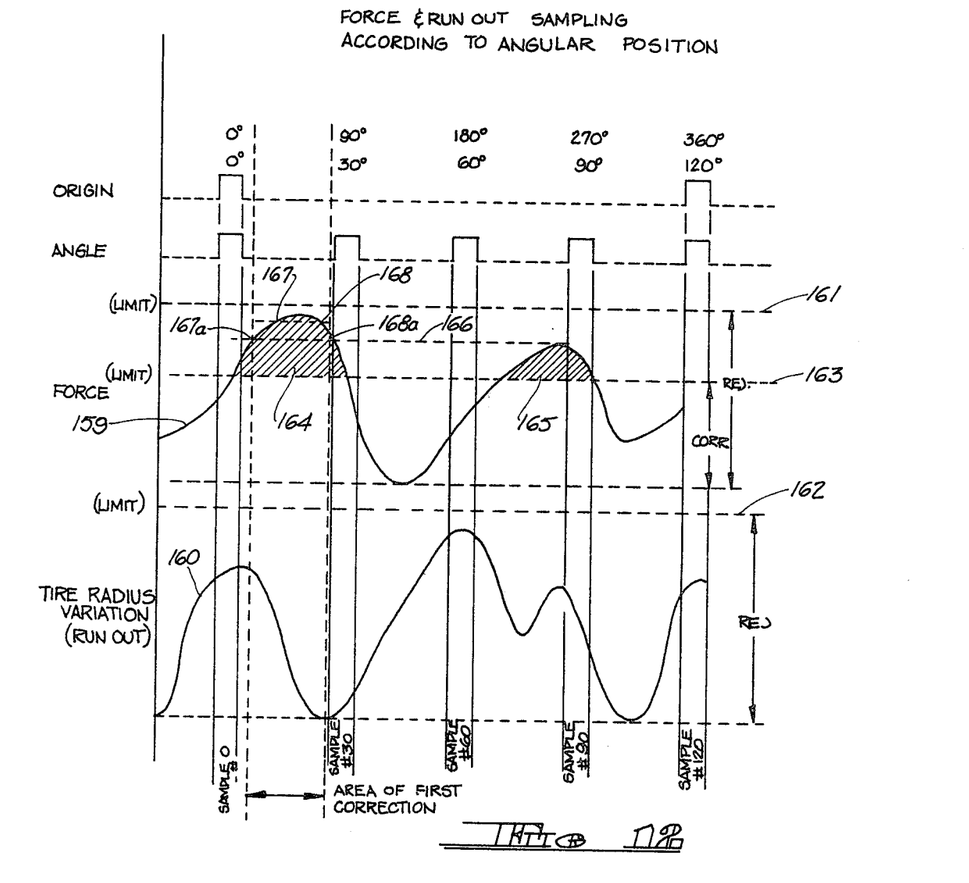
FIG. 12 is a chart illustrating force and run out samplings indicative of one revolution of a tire being corrected.

A typical print-out is illustrated in FIG. 12 wherein the irregular line 159 represents the force measurements (centrifugally generated non-uniformities) developed during one revolution of the tire, as measured by the sensors 67, 67a, and the irregular line 160 represents tire radius variations (run-out) as measured by the gauging sensor 126. Initially, the data is compared with two pre-set limits. The first limit represents values above which correction of the tire is no longer feasible; this limit is represented by the line 161 for the force measurements and the line 162 for the run-out measurements. If either the force measurements or the run-out measurements exceed the limit, the cycle will be aborted and the tire discarded.

The second limit, indicated by the line 163, represents a value below which no correction is necessary. This limit applies only to force variations produced by the centrifugally generated non-uniformities, as represented by the line 159. If the readings for a given tire fall below this limit, honing of the tire is not required and the tire only need be corrected for lack of symmetry as measured by the sensors 75, 75a.

In most instances the force values will be such that correction of the tire is required. In this connection, the tire will be honed in those areas about its periphery where the acceptable level of force variation is exceeded. To accomplish this, the computer will scan the memory bank 150 and will compare, for every angular position of the tire, the force variations at each position against the acceptable limit 163. When the force variation exceeds the acceptable limit, the computer will record the angular position at which this occurs. In the example plotted in FIG. 12, two such areas of correction are indicated, indentified at 164 and 165. In addition, the maximum force value as between these two areas of the tire will also be determined; in the example illustrated, the maximum force value of the area 164 exceeds that of area 165 by the amount lying above the line 166, which represents the maximum force value for the area 165. The computer will then actuate the honer and the periphery of the tire will be ground in the areas where the irregularities exist. The honer will first hone the area having the maximum force value, which in the example illustrated comprises the area 164. Depending upon the angle included by the irregularity, the computer will cause the honer to first contact the tire at a point 167, which represents the leading edge of the area to be corrected during initial contact by the honer, and the honer will remain in contact with the tire until the point 168 is reached, the point 168 representing the trailing edge of the area being corrected during initial contact by the honer. During the next revolution of the tire, the honer will be incrementally advanced toward the tire at the proper angular location to remove another incremental portion of the area 164, and the operation will be repeated for as many revolutions of the tire as required to reduce the area 164 until it reaches an acceptable low level, as represented by the line 163. It is to be understood that the honer will be advanced in increments of 0.0015 inch, and consequently the location of the leading and trailing endges of the area being corrected will vary. For example, during a subsequent revolution of the tire, the leading edge of the area will lie at point 167a and its trailing edge at point 168a. When the honing of the area 164 has been completed, the computer will index the honer to next act upon the area 165 until it has been reduced to an acceptable level in like manner. The honer does not act upon two or more areas of correction during a single revolution of the tire. Rather, each successive area of correction is honed to within the acceptable limit before the next area is honed, the several areas being honed in their order of decreasing magnitude of maximum force values.

It is to be understood that while the operation of the system has been described in conjunction with a single honing device, a plurality of honing devices will normally be employed, additional honers being diagrammatically represented at 169 and 170 in FIG. 5, the bank of honers being positioned so as to cover the total width of the tire surface contacted by the road wheel. Each such honing device will have a dual transmission and a dual valve hydraulic controller and they all will be computer controlled independently and simultaneously to correct adjacent areas across the width of the tire as defined by the computer from the signals received from sensors 67, 67a so that the honers will be successively actuated in accordance with their angular relation to the tire with reference to the point of origin. The transmissions for the additional honers are not provided with a stepping motor 138 and related components since only one such system is required to mark the tire for lack of symmetry at its points of maximum unbalance.

Once the honing operation has been completed, or in the event that no honing is required, the sensors 75, 75a will be utilized to measure the tire for lack of symmetry, and the points of maximum unbalance on both sides of the tire, including their angular locations relative to the point of origin, will be recorded in the memory bank 150 of the computer. Rotation of the road wheel 11 then will be stopped and the road wheel retracted by reversing the motor of gear drive 43. The computer will then energize the stepping motor 138 and clutch 139 to rotate the tire to a position in which one of its points of maximum unbalance, as measured by the sensors 75, 75a, is in alignment with the solenoid actuated marker 141, which is then actuated to mark the uppermost side wall of the tires, such mark being indicated at 171 in FIG. 1. The computer will then rotate the tire to a position in which the point of maximum unbalance on the opposite or underside of the tire will be in alignment with marker 142, which is then actuated to mark the opposite side of the tire. After the tire is marked, the honing device, including the run-out sensor, will be fully retracted by the hydraulic cylidner 124 and the sets of hydraulic cylinders 17, 18a and 18, 18a actuated to separate the wheel-halves and redeposit the tire on the conveyor for discharge, whereupon the next succeeding tire will be positioned for engagement by the wheel-halves.

While not a part of the present invention, it will be understood that the discharged tires will be transferred to a second correction device where the tires will be corrected for lack of symmetry by the addition or removal of rubber from the inner surfaces of their side walls adjacent the tire beads in accordance with the reachings of the aforesaid co-pending application Ser. No. 629,639, the marks applied to the outer surfaces of the side walls being utilized as reference points to align the tires for correction for lack of symmetry utilizing data stored in the computer memory bank relative to the magnitude of unbalance forces.

It will be understood that modifications can be made in the present invention without departing from its spirit and purpose, and it is not intended that the invention be limited other than in the manner set forth in the claims which follow.

I claim:

1. The method of correcting a rubber tire for centrifugally generated peripheral non-uniformities, which comprises the steps of rotating the tire under simulated load at a selected speed of at least about 35 m.p.h. to generate non-uniform areas of peripheral growth, the simulated load acting to create a tire patch, sensing the forces developed by said areas of growth in the area of the tire patch and generating signals indicative of the magnitude and location of the sensed forces, developing signals representative of angular locations on the periphery of the tire, correlating the signals indicative of the magnitude and location of the sensed forces with the signals indicative of angular locations on the tire to locate the areas of non-uniform growth, and removing rubber from the periphery of the tire in accordance with the magnitude and location of the areas of non-uniform growth to reduce said areas while rotating the tire at the said selected speed.

2. The method claimed in claim 1 including the step of referencing the signals representative of angular locations on the periphery of the tire with respect to a point of origin on the periphery of the tire.

3. The method claimed in claim 2 including the step of generating a signal to represent the said point of origin, and referencing the signals representative of angular locations on the periphery of the tire with respect to the signal representing said point of origin.

4. The method claimed in claim 3 in which the signal representative of the point of origin is generated once during each revolution of the tire, and generating a multiplicity of uniformly pulsed signals representative of successive angular locations on the the periphery of the tire during each revolution thereof.

5. The method claimed in claim 4 including the step of continuously measuring the contour of the periphery of the tire and generating signals representative of its contour, and correlating the signals representative of the tire's contour with the signals representative of angular locations on the periphery of the tire, whereby to determine the run-out forces developed in the tire when rotated at said selected speed.

6. The method claimed in claim 1 including the step of sensing the non-symmetrical forces developed in the tire and generating signals indicative of the magnitude of such forces, and correlating the signals indicative of lack of tire symmetry with the signals indicative of angular locations on the periphery of the tire to determine the location of the unbalancing forces.

7. The method claimed in claim 6 including the steps of generating signals indicative of lack of symmetry on opposite sides of the tire, and separately correlating the signals indicative of lack of tire symmetry on the opposite sides of the tire with the signals indicative of angular locations on the periphery of the tire, whereby to establish a point of maximum unbalance on each side of the tire.

8. The method claimed in claim 7 including the step of referencing the signals representative of angular locations on the periphery of the tire with respect to a point of origin on the periphery of the tire.

9. The method claimed in claim 8 including the step of marking the side walls of the tire to indicate the points of maximum unbalance with reference to the point of origin on the periphery of the tire 10. The method claimed in claim 9 including the steps of establishing the points of maximum unbalance on opposite sides of the tire subsequent to the removal of rubber from the periphery of the tire in the areas of non-uniform growth, stopping the rotation of the tire, and thereafter revolving the tire to align its points of maximum unbalance relative to a means for marking its side walls.

11. The method claimed in claim 1 including the steps of providing a cutting means for removing rubber from the periphery of the tire, said cutting means being movable from a retracted position in which it is out of contact with the periphery of the tire to an extended position in which it is in cutting engagement with the periphery of the tire, generating signals indicative of the leading and trailing edges of an area of non-uniform tire growth, utilizing the signal indicative of the leading edge of the growth area to move the cutter from retracted to extended position, and utilizing the signal indicative of the trailing edge of the growth area to retract the cutter.

12. The method claimed in claim 11 wherein the cutter is extended and retracted once during each revolution of the tire.

13. The method claimed in claim 12 including the step of incrementally advancing the cutter toward the periphery of the tire during successive revolutions of the tire, whereby by to incrementally reduce the growth area.

14. The method claimed in claim 13 including the step of sensing the distance between the cutter and the periphery of the rotating tire, and positioning the cutter so that it lies in closely spaced relation to the periphery of the tire when the point of maximum radial tire growth is tangentially disposed with respect to the cutter.

15. The method claimed in claim 14 wherein the tire being corrected has a plurality of areas of non-uniform growth, including the step of sequentially reducing the areas of non-uniform growth commencing with the area having the largest radial growth.

16. The method claimed in claim 15 wherein successive areas of non-uniform growth are reduced in the order of their decreasing magnitude of radial growth.

17. The method claimed in claim 16 including the steps of providing a plurality of said cutters positioned at spaced apart intervals relative to the periphery of the tire, and sequentially actuating said cutters in accordance with the magnitude and location of said successive areas of non-uniform growth.

18. The method claimed in claim 17 including the step of generating separate sets of signals for each of said cutters representative of both the magnitude and locations of said areas of non-uniform growth.

19. The method of correcting a rubber tire for centrifugally generated peripheral non-uniformities, comprising the steps of rotating the tire against a road wheel under simulated load at a selected speed of at least about 35 m.p.h. to generate non-uniform areas of peripheral growth, generating force signals representative of the magnitude and location of said areas of growth, converting said force signals to signals representative of angular locations on the periphery of the tire, and utilizing said representative signals to remove rubber from the periphery of the tire in accordance with the magnitude of the said growth areas while rotating the tire at said selected speed.

20. The method claimed in claim 19 including the step of developing a reference position on the periphery of the tire, and correlating said reference position with said representative signals to locate the areas of non-uniform growth.

21. The method claimed in claim 20 including the step of providing timing means and rotating said timing means in synchronism with the speed of rotation of said tire, and correlating the position of said timing means relative to said reference position in accordance with said representative signals.

22. The method claimed in claim 21 wherein said timing means comprises a pair of timing discs each rotating in synchronism with the speed of rotation of the tire, the first of said timing discs being positioned relative to said reference position to indicate the leading edge of a growth area, and the second disc being positioned relative to said reference position to indicate the trailing edge of the growth area, including the step of utilizing said timing discs to initiate and terminate the removal of rubber from the periphery of the tire.

23. The method claimed in claim 19 including the step of pre-stressing the tire prior to correcting for said peripheral non-uniformities.

24. The method claimed in claim 23 wherein said tire is pre-stressed by being rotated for a number of revolutions at a speed in excess of said selected speed and under a simulated load greater than the simulated load applied when the tire is rotated at said selected speed.

25. The method claimed in claim 24 wherein the tire is rotated first in one direction and then in the other during pre-stressing.

26. The method claimed in claim 25 wherein the tire is inflated to a greater than normal air pressure during pre-stressing.

27. The method claimed in claim 26 wherein during pre-stressing the tire is inflated to an air pressure about 20% in excess of its intended operating pressure, wherein the simulated load is about 20% greater than the simulated load applied when the tire is rotated at said selected speed, and wherein the tire is rotated at a speed about 20% in excess of said selected speed.

* * * * *